April 9, 1940.　　　S. R. THORNTON　　　2,196,617
VARIABLE PITTER
Filed Oct. 3, 1938　　　2 Sheets-Sheet 1
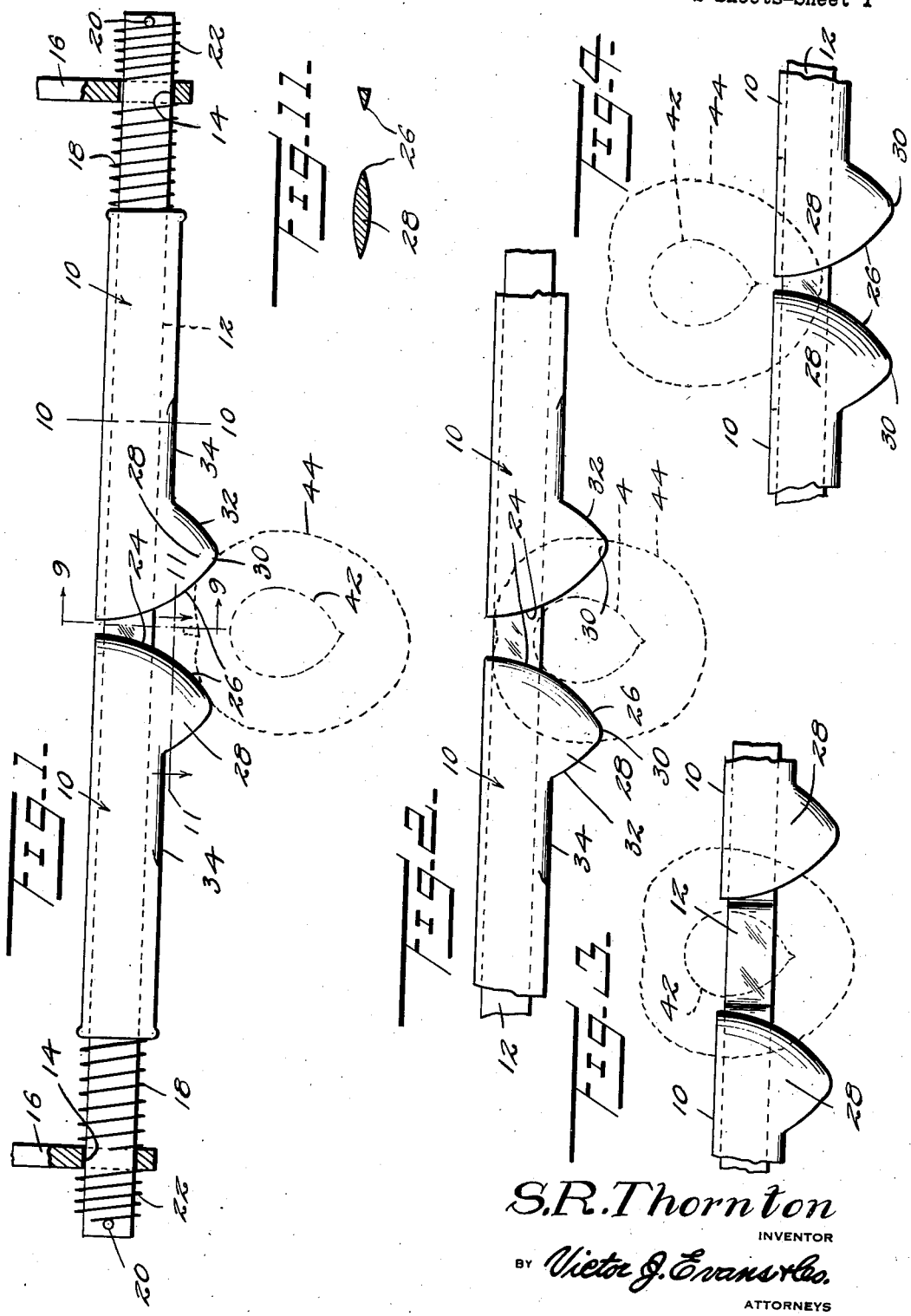
S.R.Thornton
INVENTOR
BY Victor J. Evans & Co.
ATTORNEYS April 9, 1940.     S. R. THORNTON     2,196,617
VARIABLE PITTER
Filed Oct. 3, 1938     2 Sheets-Sheet 2
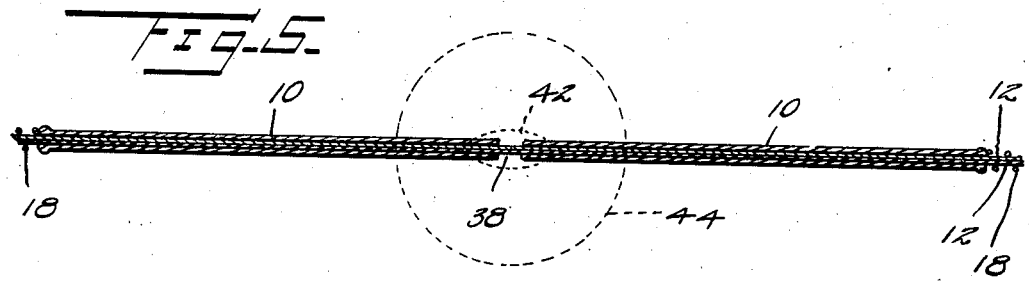
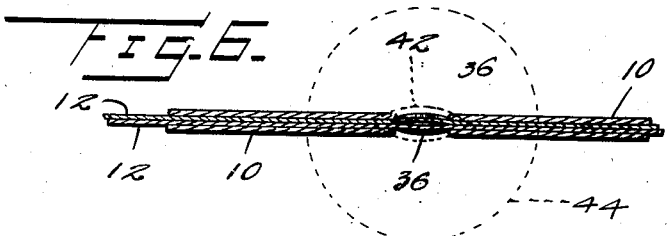
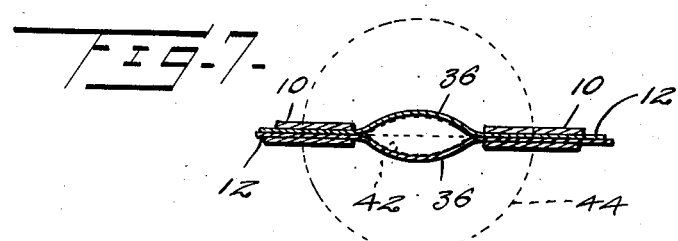
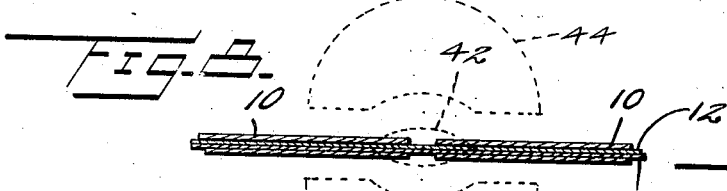
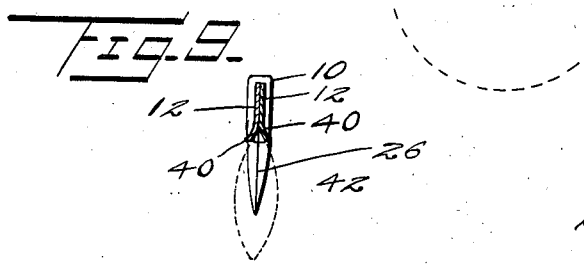
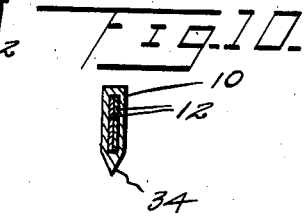
S.R.Thornton
INVENTOR
BY Victor J. Evans & Co.
ATTORNEYS Patented Apr. 9, 1940

2,196,617

UNITED STATES PATENT OFFICE 2,196,617

VARIABLE PITTER

Stuart R. Thornton, Oakland, Calif.

Application October 3, 1938, Serial No. 233,069

1 Claim. (Cl. 146—28)

My invention relates to the removal of a pit from fruits such as peaches, plums, apricots, etc., and has among its objects and advantages the provision of an improved variable pitter.

An object of my invention is to provide a variable pitter designed to effectively divide the meat of the fruit from the pit. The device consists essentially of a pair of flexible elements adapted to pass through the fruit and form a loop upon each side of the pit therein for dividing the meat from the pit. In addition, the flexible elements are associated with means for halving the fruit simultaneously with the removal of the pit therefrom.

In the accompanying drawings:

Figure 1 is a plan view of my invention;

Figure 2 is a view similar to Figure 1 illustrating the flexible elements in their first stage of operation;

Figure 3 is a view illustrating the pit substantially divided from the meat of the fruit;

Figure 4 is a view illustrating the final stages of the operation;

Figure 5 is a longitudinal sectional view;

Figure 6 is a longitudinal sectional view illustrating the flexible elements about to form over the pit;

Figure 7 is a sectional view illustrating the flexible elements passing over the larger area of the pit;

Figure 8 is a view illustrating complete severance of the fruit and removal of the pit therefrom;

Figure 9 is a sectional view along the line 9—9 of Figure 1;

Figure 10 is a sectional view along the line 10—10 of Figure 1; and

Figure 11 is a sectional view along the line 11—11 of Figure 1.

In the embodiment selected to illustrate my invention, I make use of a pair of sleeves 10 which slidably house flexible elements 12 in the nature of relatively thin steel ribbons. Flexible elements 12 extend beyond the outer ends of the sleeves 10 and are loosely receivable within slots 14 in supports 16. Between the outer ends of the sleeves 10 and the supports 16, I mount compression springs 18. These springs urge the sleeves 10 to their normal positions of Figure 1, but the sleeves may be moved outwardly of the flexible elements 12, as illustrated in Figures 2 and 3.

Figure 1 illustrates the flexible elements 12 as extending beyond the relatively fixed supports 16, while the two flexible elements are keyed by transverse pins 20. Between the pins 20 and the supports 16 I mount compression springs 22 which lend the necessary tautness to the flexible elements.

Each sleeve 10 includes a concaved end 24 terminating in a knife edge 26 of a blade 28. Figure 1 illustrates the blades 28 as projecting laterally of their respective sleeves, and each blade terminates in a point 30. Each blade also includes a knife edge 32 running into a similar edge 34 extending partly along its respective sleeve 10, as illustrated in Figure 1.

Figure 6 illustrates the flexible elements 12 as being bowed at 36. Normally the bows 36 are flattened, as illustrated at 38 in Figure 5 because of the pressure relation between the sleeves 10 and the flexible elements. Bows 36 will spring outwardly as soon as the sleeves 10 have been moved outwardly of the flexible elements a short distance. Figure 9 illustrates the leading edges of the flexible elements 12 as being bellied outwardly at 40 to facilitate entrance of the pit 42. While the compression springs 22 place the flexible elements 12 under tension, the tension of the springs is not sufficient to flatten the bows 36. In other words, the bows will spring out as soon as they are uncovered by the sleeves 10.

Figure 2 illustrates the application of the device to fruit in the nature of peaches. Figure 1 illustrates the peach 44 positioned adjacent the knife edges 26 of the blades 28. As the peach 44 is advanced, the blades 28 cut the meat cleanly and as the curved knife edges 26 engage the pit, the sleeves 10 will be shifted apart. As the sleeves are shifted apart slightly, bows 36 spring out as the pit 46 enters between the bellied reaches 40 of the bows 36. Further advance of the fruit causes the pit 46 to be pressed between the flexible elements. Because of their highly flexible nature, the elements 12 will take the configuration of the pit 46 so as to effectively divide the meat from the pit.

The blades 28 cut the meat of the fruit cleanly up to the pit and constitute means for halving the fruit simultaneously with removal of the pit therefrom. The compression springs 18 hold the cutting edges 26 in sufficient pressure relation with the pit so as to insure effective severance of the fruit. At the same time, the compression springs 22 maintain the flexible elements 12 under sufficient tension so as to draw the elements closely to the configuration of the pit.

Blades 28 have knife edges on both sides, while the sleeves 10 are provided with knife edges of sufficient length so as to insure clean severance of relatively large fruit. In operation, the fruit is placed with the stem end under the sleeve lugs. Movement of the fruit against the blades forces the sleeves apart so that the blades may conform to the contour of the pit. Since the sleeves 10 are separated only through engagement with the pit, it will be seen that the sleeves cooperate with the pit for bowing the flexible elements in such manner as to closely hug the contour of the pit. As the knife edges cut through the fruit, the ribbons or flexible elements move together. The sleeves will be moved in the direction of each other and press the bowed runs 36 into straight line relation, as illustrated in Figure 5. The flexible ribbons easily conform to the size and contour of the pit so as to insure clean separation.

Without further elaboration, the foregoing will so fully illustrate my invention that others may, by applying current knowledge, readily adapt the same for use under various conditions of service.

I claim:

A fruit pitter comprising two sleeves arranged end to end, a pair of flexible blade-like elements conformable to the contour of the pit for dividing the latter from the meat of the fruit, said elements being arranged in juxtaposed relation and extending loosely through said two sleeves with the latter slidable on said elements, supports for slidably supporting said elements, resilient means mounted on said elements and contacting said supports for tensioning said elements, resilient means mounted on said elements between said supports and said sleeves for urging the latter in the direction of each other, a blade formed on the inner end of each sleeve for severing the meat of the fruit, said blades having cutting edges arranged in diverging relation to facilitate entrance of the fruit, said cutting edges being arranged to sever the meat in advance of said elements with respect to their engagement with the pit, and said sleeves being separated through engagement of said blades with the pit to permit the elements to flex between the ends of the sleeves and conform to the contour of the pit.

STUART R. THORNTON.